United States Patent
Cuddihy et al.

(10) Patent No.: US 10,691,713 B2
(45) Date of Patent: *Jun. 23, 2020

(54) METHOD AND TOOL FOR BROWSING SEMANTIC DATA AND CREATING QUERIES USING A DOMAIN/RANGE REPRESENTATION

(71) Applicant: General Electric Company, Schenectady, NY (US)

(72) Inventors: Paul Edward Cuddihy, Ballston Lake, NY (US); Justin De Spenza McHugh, Latham, NY (US); Ravi Kiran Reddy Palla, Glenville, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 321 days.

This patent is subject to a terminal disclaimer.

(21) Appl. No.: 15/672,659

(22) Filed: Aug. 9, 2017

(65) Prior Publication Data
US 2017/0351685 A1    Dec. 7, 2017

Related U.S. Application Data

(63) Continuation of application No. 14/572,225, filed on Dec. 16, 2014, now Pat. No. 9,760,614.

(51) Int. Cl.
G06F 16/00 (2019.01)
G06F 16/25 (2019.01)
G06F 16/248 (2019.01)
G06F 16/242 (2019.01)
G06F 16/2455 (2019.01)

(52) U.S. Cl.
CPC .......... *G06F 16/252* (2019.01); *G06F 16/248* (2019.01); *G06F 16/2423* (2019.01); *G06F 16/2455* (2019.01)

(58) Field of Classification Search
None
See application file for complete search history.

(56) References Cited

U.S. PATENT DOCUMENTS

| | | | | |
|---|---|---|---|---|
| 8,572,511 B1* | 10/2013 | Barnett | ............... | G06F 16/2428 715/848 |
| 8,935,129 B1* | 1/2015 | Gao | ................... | G06F 16/9024 703/1 |
| 2014/0074888 A1* | 3/2014 | Potter | ................. | G06F 16/2428 707/779 |

* cited by examiner

*Primary Examiner* — Son T Hoang
(74) *Attorney, Agent, or Firm* — Buckley, Maschoff & Talwalkar LLC (57) ABSTRACT

A method in a computer system includes displaying a user interface screen to aid in generating search queries for a semantic database. The user may select two or more data classes from a displayed class hierarchy. Analysis of the semantic database may lead to generating and displaying one or more paths via class relationships between selected data classes. The user may interact with a displayed path of class relationships to provide input to the system, and from that input the system may automatically generate a search query.

17 Claims, 11 Drawing Sheets

METHOD AND TOOL FOR BROWSING SEMANTIC DATA AND CREATING QUERIES USING A DOMAIN/RANGE REPRESENTATION

CROSS-REFERENCE TO RELATED APPLICATION

This application is a continuation of U.S. patent application Ser. No. 14/572,225 filed on Dec. 16, 2014, entitled "METHOD AND TOOL FOR BROWSING SEMANTIC DATA AND CREATING QUERIES USING A DOMAIN/RANGE REPRESENTATION", which is incorporated herein by reference in its entirety for all purposes.

BACKGROUND

Technical Field

Embodiments of the invention relate to semantic database searching.

Discussion of Art

Semantic databases are well-known. Such databases may be built from a conceptual data model that specifies relationships among data objects.

The users of semantic databases typically are experts in the subject matter (sometimes called the "domain") to which the data relates. Typically such users do not have expert knowledge about how databases are constructed nor are they typically versed in the particular framework of relationships (sometimes called an "ontology") among data classes that was used to build the database they wish to search. They may also not be familiar with formal requirements for composing valid search queries. Therefore, database users may sometimes need to pursue the potentially inconvenient process of consulting with an expert in the design of the database in order to obtain desired information from the database.

The present inventors have now recognized opportunities to provide an improved tool for constructing semantic database search queries, where the tool may be readily usable by domain experts without requiring them to consult database design experts or to have expertise in database design themselves.

BRIEF DESCRIPTION

In some embodiments, a method includes displaying a screen display to a user on a display device. The screen display may include (a) a class hierarchy section in which a hierarchy of data classes is displayed; and (b) a graphical display area. The data classes may correspond to data stored in a semantic database. The method also includes receiving data input from the user. The data input may indicate user selection of at least two of the data classes from the hierarchy of data classes. The at least two data classes may include a first selected data class and a second selected data class. In addition, the method includes responding to the data input by analyzing class relationships among the data classes in the semantic database to generate at least one graphically illustrated path that illustrates a path via the class relationships between the first selected data class and the second selected data class. Further, the method includes displaying the at least one graphically illustrated path in the graphical display area. Still further, the method includes receiving input indicative of user interaction with the displayed graphically illustrated path. The user interaction includes at least (a) selection of a plurality of data fields; and (b) defining at least one constraint. Moreover, the method includes automatically generating a database search query in response to the received input indicative of user interaction. The search query has the function of returning at least the selected plurality of data fields and returning results in accordance with the at least one constraint that was defined.

In some embodiments, an apparatus includes a processor and a memory in communication with the processor. The memory stores program instructions, and the processor is operative with the program instructions to perform functions as set forth in the preceding paragraph.

DESCRIPTION

Some embodiments of the invention relate to database searching, and more particularly to automatic generation of search queries to be applied to a semantic database. In a graphical user interface, the user is permitted to select two data classes from a hierarchy of data classes that are stored in the database. The hierarchy is displayed by a query building software tool. The tool analyzes relationships among the data classes to find paths between the selected data classes. The tool displays the paths and allows the user to pick one path. The user is then allowed to interact with the selected path to indicate data class attributes that are to be included in results to be returned from the database and/or to define constraints that are to be applied to data class attributes. The tool automatically generates a search query based on the user interaction with the selected path. The user may initiate a search of the database in accordance with the search query generated by the tool.

The query may be automatically generated according to rules or techniques that optimize search performance.

Figure 1:
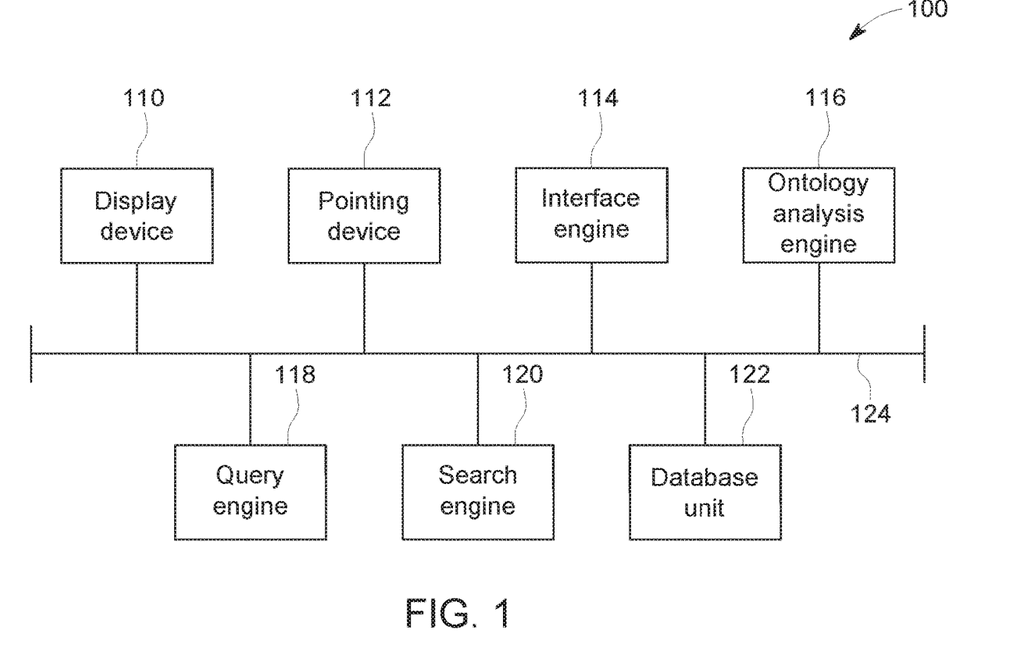
FIG. 1 is a block diagram of a computing system according to some embodiments.

FIG. 1 represents a logical architecture for describing systems, while other implementations may include more or different components arranged in other manners. In FIG. 1, a system 100 includes a display device 110, which may be a conventional computer system display component such as a flat panel display. In addition, the system 100 includes a pointing device 112, such as a conventional computer mouse.

Still further, the system 100 includes an interface engine 114. The interface engine 114 may include hardware and/or software resources to cause a graphical user interface (GUI) to be displayed on the display device 110 in accordance with some embodiments including, e.g., example embodiments described herein. The interface engine 114 also engages in receiving input from a user (not shown) of the system 100 based on the user's interactions with the interface displays provided by the interface engine 114.

Moreover, the system 100 includes an ontology analysis engine 116. The ontology analysis engine 116 may include hardware and/or software resources that respond to input received via the interface engine 114. As will be described further below, the ontology analysis engine 116 may analyze data class relationships embodied in a semantic database that is stored in the system 100. The analysis by the ontology analysis engine 116 may determine or discover paths that can be traversed, via the data class relationships, from one data class selected by the user to a second data class selected by the user. Outcomes of the analyses performed by the ontology analysis engine 116 may be passed to the interface engine 114 to trigger further interface displays to be provided by the interface engine 114 via the display device 110.

The system 100 also includes a query engine 118. The query engine 118 may include hardware and/or software resources of the system 100. The query engine may respond to user input received via the interface engine 114 to automatically generate a database search query that reflects user interaction via the GUI with a displayed class relationship path. The query engine may incorporate rules which govern the syntax of search queries. Based on those rules, the query engine may translate the user input into a search query that will return data that the user has indicated is of interest.

Also included in the system 100 is a search engine 120. The search engine 120 may include hardware and/or software resources of the system 100. The search engine may apply the search query generated by the query engine 118 to the semantic database to find classes and attributes specified by the search query.

The system 100 further includes a database unit 122, which may include hardware and/or software resources of the system 100. In some embodiments, the database unit 122 may operate in a substantially conventional manner relative to storage and retrieval of information in and from a semantic database. It will be noted, however, that the generation of the search queries to be applied to the database unit 122 may be accomplished in accordance with embodiments hereof. The database unit 122 may include, for example, any one or more data storage devices that are or become known. Examples of data storage devices include, but are not limited to, a fixed disk, an array of fixed disks, and volatile memory (e.g., Random Access Memory).

Also, the system 100 includes a communication infrastructure 124. The communication infrastructure 124 is shown as providing operational connections among the other components shown in FIG. 1 and enumerated above. The communication infrastructure 124 may, for example, include one or more data buses and/or facilities for communications among software components.

In some embodiments, one or more of the components 114, 116, 118 and 120 may be constituted by dedicated and/or hardwired hardware processing units and/or by software components operating on conventional general purpose computer hardware.

Figure 2:
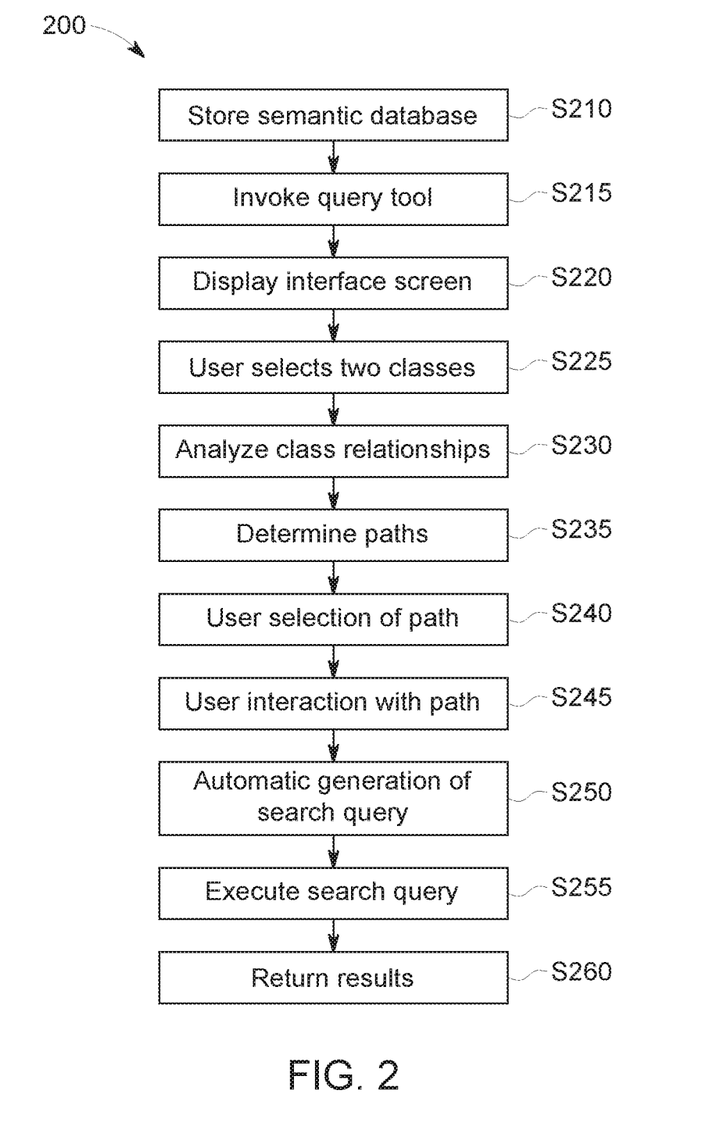
FIG. 2 is a flow diagram of an operation according to some embodiments.

FIG. 2 is a flow diagram of a process 200 according to some embodiments. In some embodiments, various hardware elements (e.g., a processor) of the system 100 execute program code to perform that process and/or the processes illustrated in other flow diagrams. The process and other processes mentioned herein may be embodied in processor-executable program code read from one or more non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Figure 3:
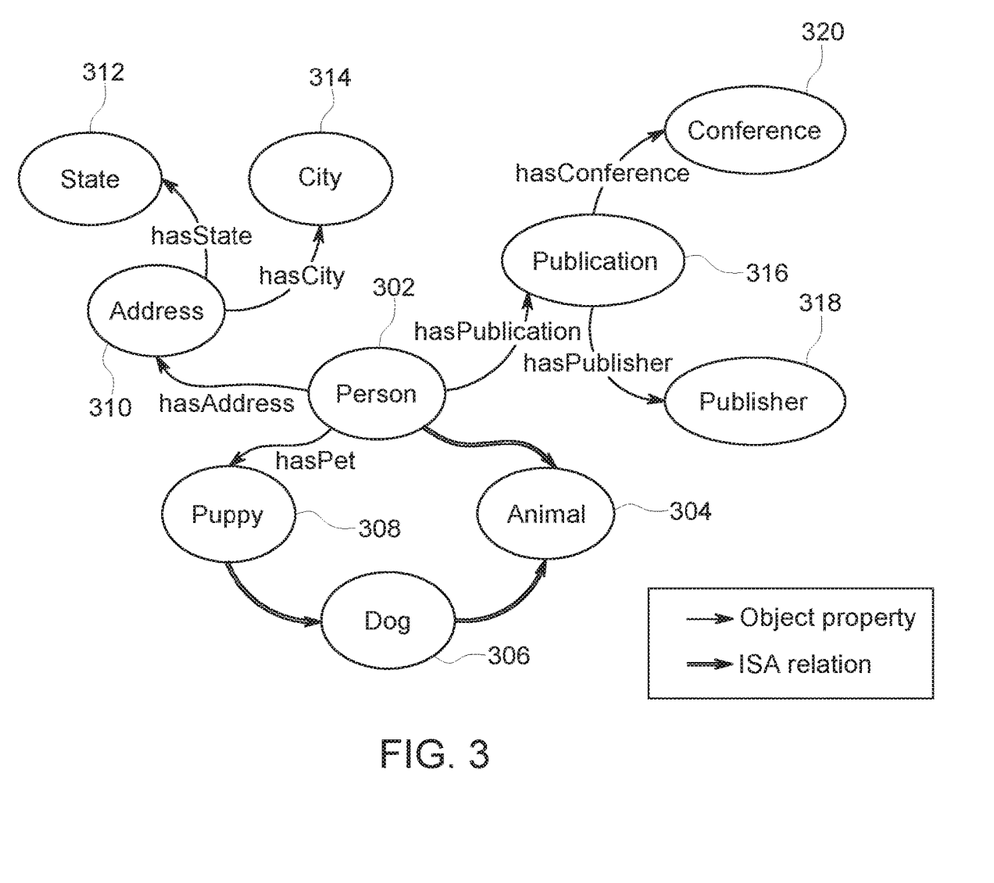
FIG. 3 is a diagram that illustrates a simple example semantic ontology.

Initially, at S210, the above-mentioned semantic database is stored in the database unit 122. The semantic database may have a structure that includes relationships among various data classes, in accordance with an ontology. FIG. 3 is a diagram that illustrates a simple example semantic ontology. It will be noted that the diagram of FIG. 3 is in the form of a directed graph. The data classes illustrated for the ontology of FIG. 3 include a "person" data class 302, an "animal" data class 304, a "dog" data class 306, a "puppy" data class 308, an "address" data class 310, a "state" data class 312, a "city" data class 314, a "publication" data class 316, a "publisher" data class 318, and a "conference" data class 320. The ontology of FIG. 3 also includes the following relationships among classes: An "isA" relationship from class 302 to class 304; an "isA" relationship from class 306 to class 304; an "isA" relationship from class 308 to class 306; a "hasPet" relationship from class 302 to class 308; a "hasAddress" relationship from class 302 to class 310; a "hasState" relationship from class 310 to class 312; a "hasCity" relationship from class 310 to class 314; a "hasPublication" relationship from class 302 to class 316; a "hasConference" relationship from class 316 to class 320; and a "hasPublisher" relationship from class 316 to class 318.

Referring again to FIG. 2, at S215, a user of the system 100 may invoke the above-mentioned tool for automatically generating search queries. For example, the user may launch the tool from a menu of software programs available from a computer or terminal. In response to the user's action, the system 100, via the interface engine 114 and the display device 110, may display a user interface screen display for the tool, as indicated at S220 in FIG. 2. An example of such a screen display is shown in FIG. 4.

Figure 4:
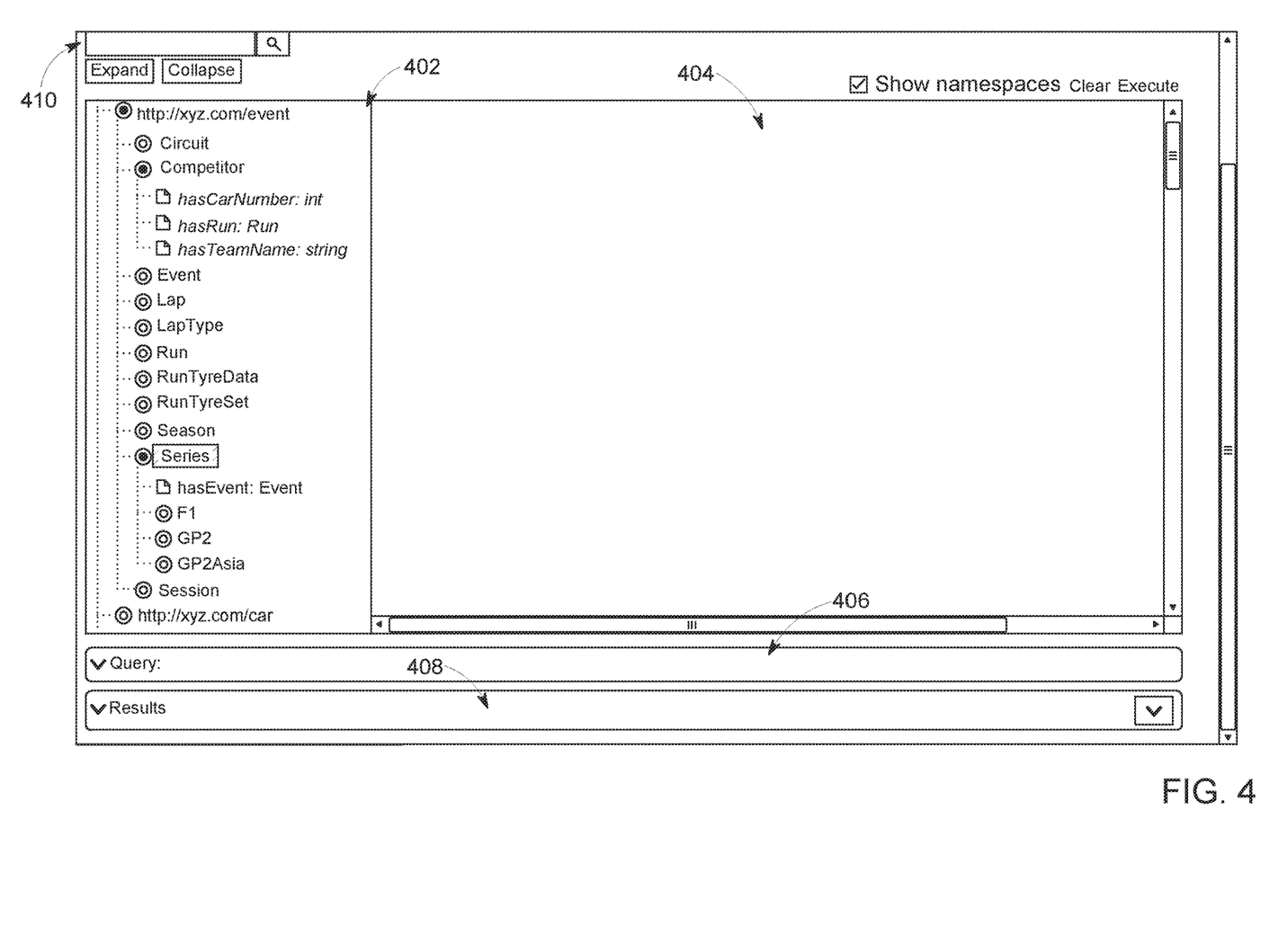
FIGS. 4 and 5 are example screen displays that may be provided according to some embodiments.

Referring to FIG. 4, the screen display shown therein includes a class hierarchy section 402, which displays a hierarchy of data classes for the semantic database that the user wishes to search. That is, the data classes displayed in the class hierarchy section 402 correspond to data that is stored in the semantic database that the user wishes to search. (It is to be noted that the example semantic database assumed to exist for the screen displays 4, 5 and 7-10 is different from the highly simplified example ontology illustrated in FIG. 3. The example database reflected in FIG. 4 and subsequent screen display drawings is assumed to store data relating to automobile racing operations.) The class hierarchy may be dynamically generated by the system 100 based on the ontology of the semantic data that is to be searched.

In addition, the screen display of FIG. 4 includes a graphical display area 404 and a query display area 406. Subsequent drawing figures will show these areas populated with display elements generated by the query tool in response to input provided by the user.

Continuing to refer to FIG. 4, the screen display shown therein further includes a results display area 408, in which the system 100 may display results of database searches produced by applying, to the semantic database, queries generated by the query tool.

Also shown in FIG. 4 as part of the screen display is a search box 410. The search box 410 may aid the user in navigating the class hierarchy section 402 and/or discovering the contents of the class hierarchy section 402. For example, the user may type input into the search box 410. If that input corresponds to one or more of the data classes, then the input causes the corresponding data classes to be highlighted in the hierarchy.

The screen window implicit in FIG. 4 does not reveal all the features of the screen display generated by the interface engine 114. Additional features of the screen display will be described with reference to other drawing figures.

Referring again to FIG. 2, at S225, the user may select two or more data classes from the hierarchy displayed in the class hierarchy section 402 (FIG. 4). In some embodiments, the user may be permitted to select the classes by (separately) dragging them from the class hierarchy section 402 into the graphical display area 404 (FIG. 4). In addition or alternatively, according to other embodiments, the user may be permitted to select the data classes of interest by other types of actions, such as double-clicking on them, by right-clicking on them, etc. It will be appreciated that these actions may be taken by the user operating the pointing device 112 (FIG. 1) to interact with the class hierarchy 402 (FIG. 4). These actions result in the system receiving data input from the user. The user may decide which two data classes to select according to the type of information that the user wishes to receive from the semantic database. The user's selection of the two data classes may reflect the user's expert understanding of the domain to which the stored data relates, and may for example reflect the two data classes that the user considers to be most relevant to the domain-related subject that the user wishes to explore.

Referring again to FIG. 2, at S230 the ontology analysis engine 116 (which may be triggered by the interface engine 114) may respond to the data input by the user (i.e., may respond to the selection of the data classes) by analyzing class relationships among the data classes in the semantic database to generate a number of paths through the ontology of the semantic database such that the paths connect selected data classes to each other. That is, as indicated at S235 in FIG. 2, the ontology analysis engine 116 may generate paths via the relationships in the ontology from one of the two selected data classes to the other. In some embodiments, and/or in some situations, this analysis of the class relationships may generate two, three or more such paths.

Figure 5:
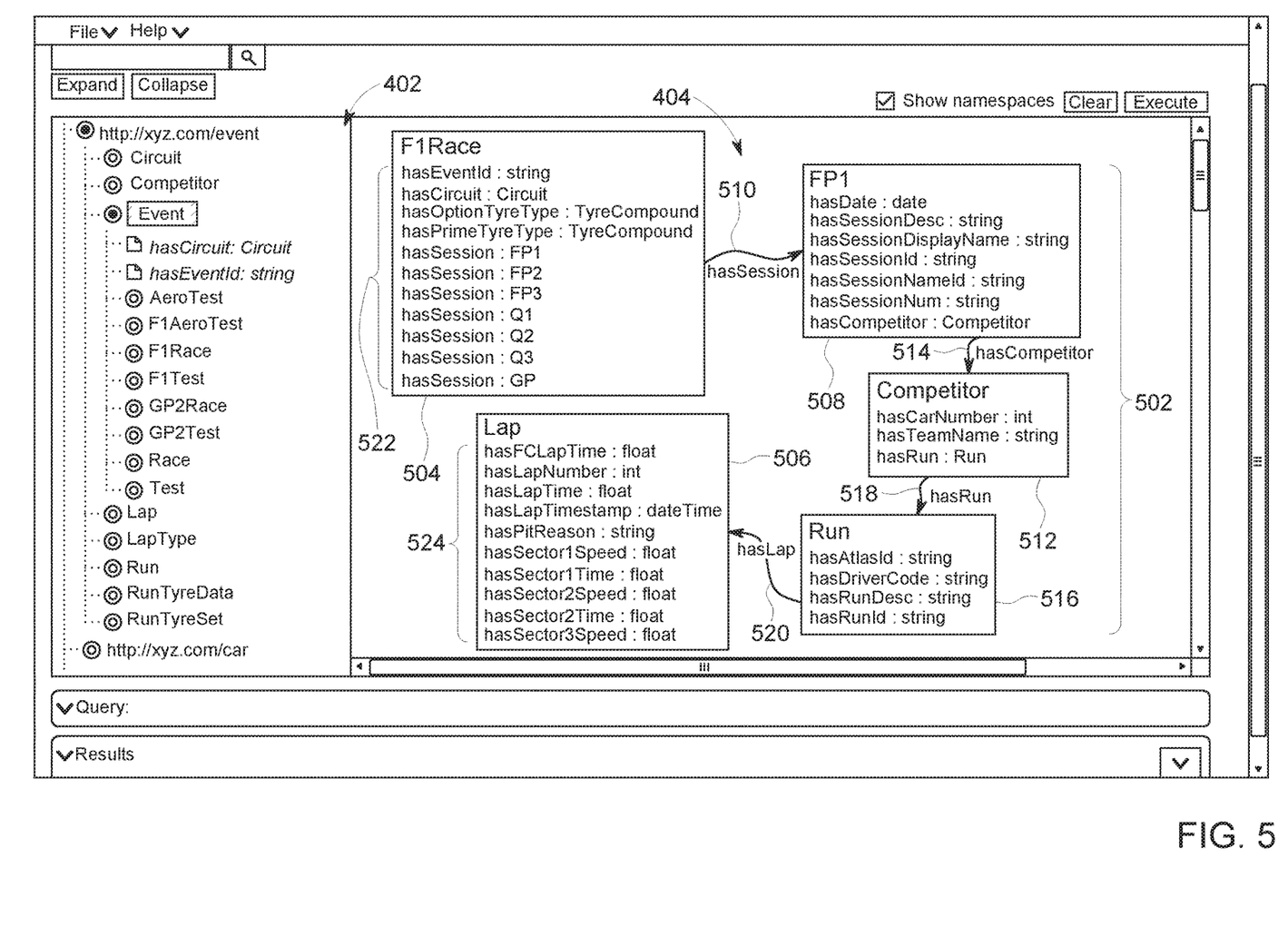

FIG. 5 shows one such path, indicated generally at 502 in graphical display area 404. However, in a prior part of the process, not directly illustrated in the screen display drawings, the system 100 may display (via the display device 102 and the interface engine 114) several reduced-size or "thumbnail" representations of the paths generated by the ontology analysis engine 116 at S235. The user may then be permitted to select one of the reduced-size displayed baths, as indicated at S240 in FIG. 2. The user may, for example, be permitted to indicate his/her selection of one of the paths by clicking on the path he/she desires to select. This may lead to the system 100 displaying only the selected path, in a screen display like that shown in FIG. 5. It may often be the case that the user will select the path that is the simplest or shortest. In some embodiments, the displaying of multiple paths may be omitted, as well as the user selection, and the system 100 may itself select one of the paths—e.g., the simplest or shortest path. Again in this case, a screen display like that shown in FIG. 5 may then be presented to the user. Automatic selection among multiple paths by the system may be a fixed feature of the system 100, or may be an option that the user may select, perhaps after multiple paths (not shown) have been displayed and the user has elected not to select among the paths himself/herself.

Referring now to FIG. 5, the discussion will now turn to the displayed path 502. It will be noted that the displayed path 502 has two end points, namely a block 504 that corresponds to the "F1Race" data class, and a block 506 that corresponds to the "Lap" data class. It is to be understood that these two data classes are the classes that the user selected from the class hierarchy section 402 in the step S225 referred to above.

It will be noted that the displayed path 502 includes a block 508 that corresponds to the "FP1" data class. The relationship-indicating arrow 510 indicates that there is a "hasSession" relationship from the "F1Race" data class to the "FP1" data class.

The displayed path 502 further includes a block 512 that corresponds to the "Competitor" data class. The relationship-indicating arrow 514 indicates that there is a "hasCompetitor" relationship from the "FP1" data class to the "Competitor" data class.

Still further, the displayed path 502 includes a block 516 that corresponds to the "Run" data class. The relationship-indicating arrow 518 indicates that there is a "hasRun" relationship from the "Competitor" data class to the "Run" data class. Also, the relationship-indicating arrow 520 indicates that there is a "hasLap" relationship from the "Run" data class (block 516) to the "Lap" data class (block 506).

Each of the blocks 504, 508, 512, 516 and 506 in displayed path 502 may also be referred to as a "node". The endpoint nodes 504 and 506 were directly selected by the user; the other nodes were generated by the system 100 in the path-determining step S235 (FIG. 2) discussed above.

Referring again to FIG. 5, and as indicated, for example, by reference numerals 522 and 524, each node also lists attributes of the data class that the node represents.

Figure 6:
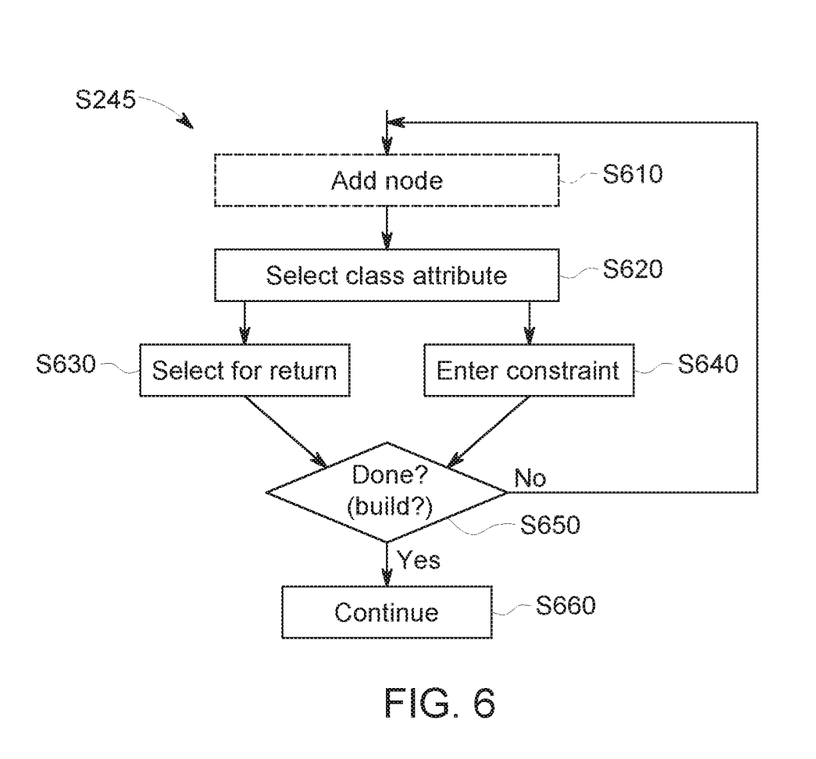
FIG. 6 is a flow diagram that shows some details of the operation of FIG. 2.

Referring once more to FIG. 2, S245 represents interactions that the user is permitted to perform with respect to the displayed path 502 of FIG. 5. FIG. 6 is a flow diagram that shows details of S245.

Referring to FIG. 6, at S610 (shown in phantom), in some embodiments, the user may be permitted to interact with the displayed path 502 by adding further nodes to the displayed path. The initial stage of this step is not explicitly illustrated in the screen display drawing figures, but it may involve the user selecting one or more entries from the class hierarchy shown in class hierarchy section 402, where the corresponding data classes are not already represented by nodes included in the displayed path 502. For example, the user may indicate selection of an additional data class by dragging the corresponding entry in the class hierarchy from the class hierarchy section 402 to the graphical display area 404. In some embodiments, selection of a further node may also or alternatively be permitted by double-clicking and/or right-clicking the desired entry in the class hierarchy. Selection of an entry from the class hierarchy causes the system 100 to display a new block/node in graphical display area 404 to represent the newly-selected data class. The system may automatically connect the new node to a previously-existing node based on a relationship that exists in the semantic database ontology between the two corresponding data classes. For example, if the user were to select from the class hierarchy a data class (say "LapNumber") that corresponds to an attribute/relationship listed in the "Lap" node 506, then the system will show both the new node (not shown) for the "LapNumber" class and will also show a relationship-indicating arrow (not shown) from the "Lap" node to the new node.

Figure 9:
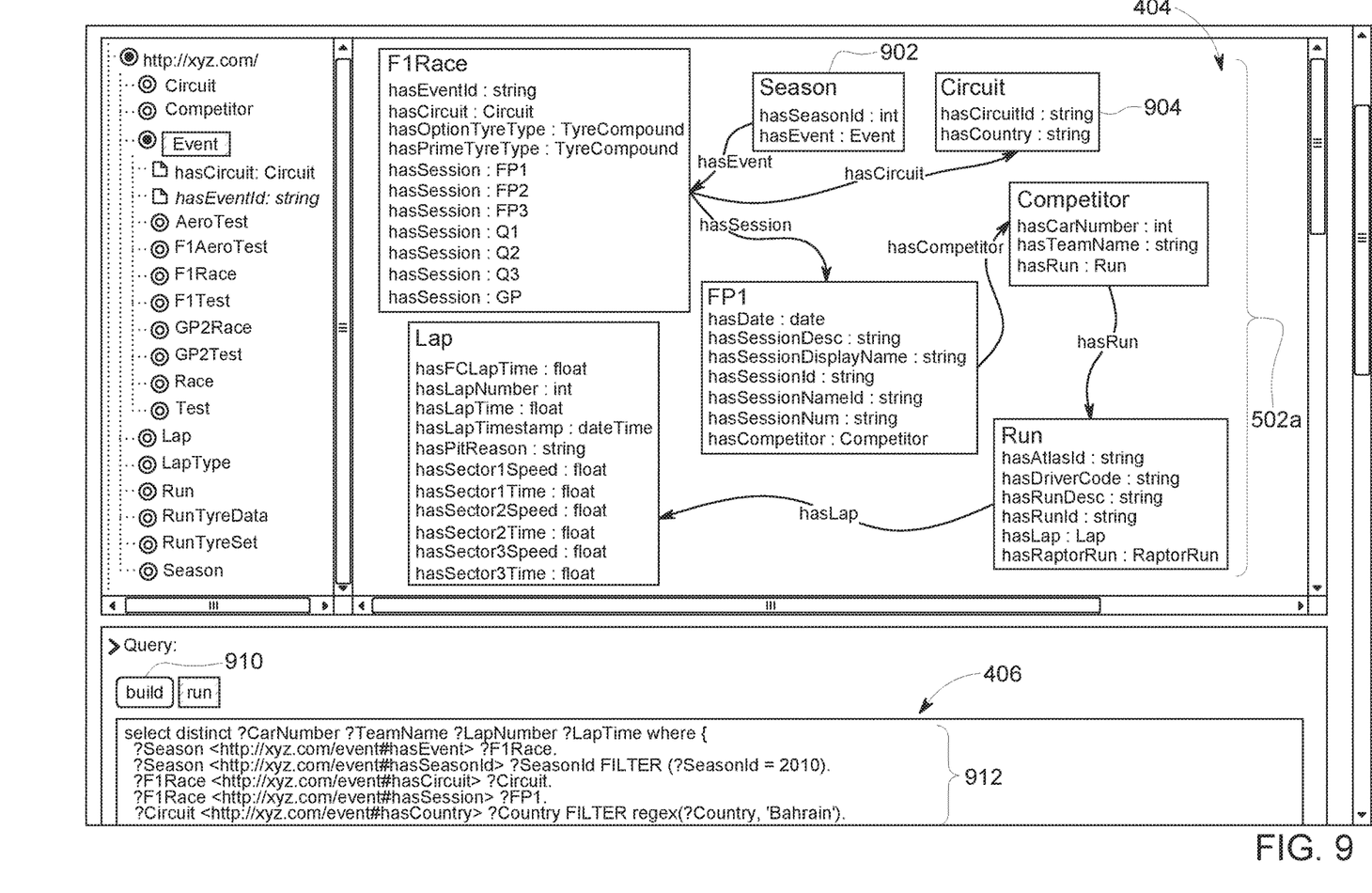
Figure 10:
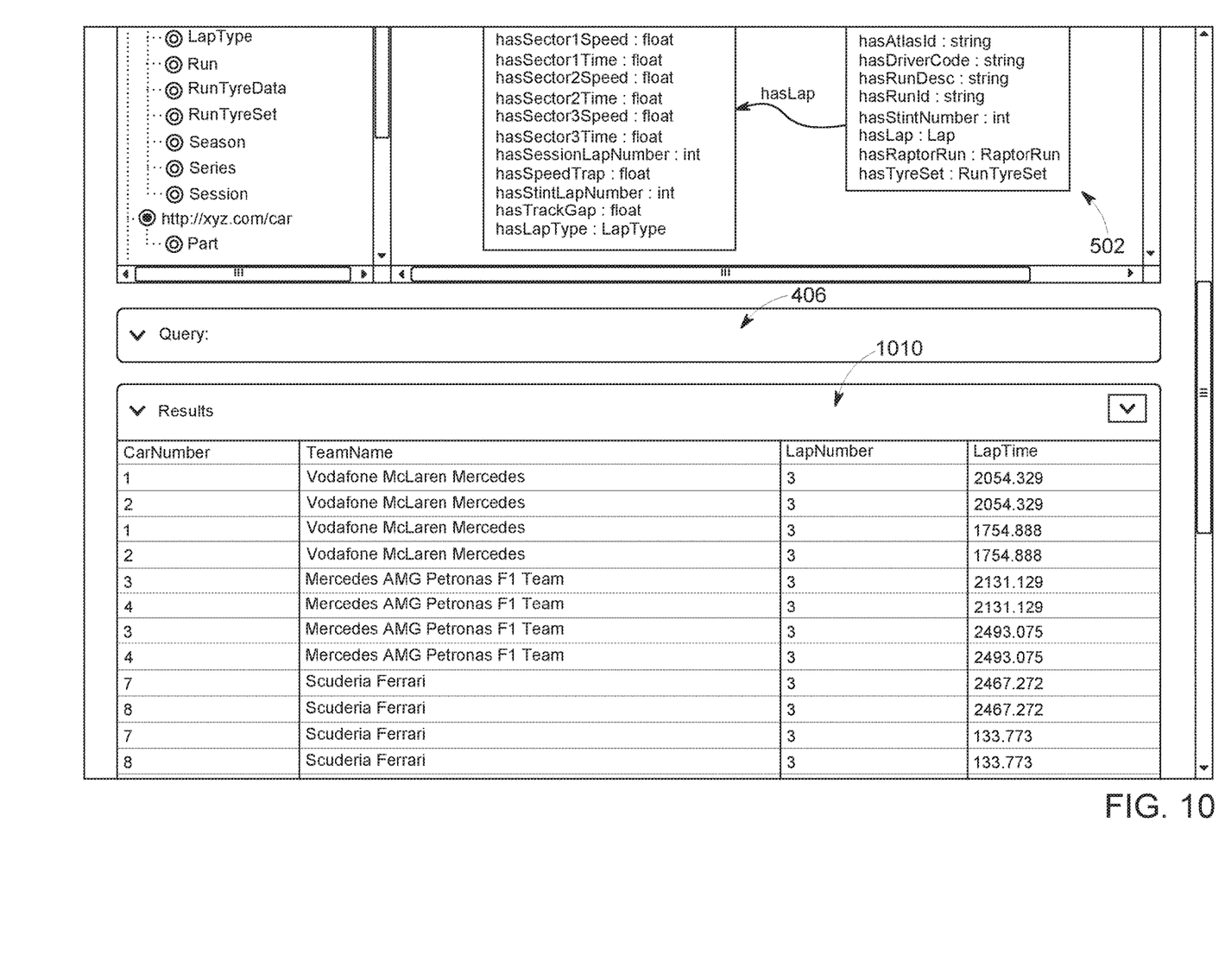

Referring briefly to FIG. 9, the presence of nodes 902 and 904 indicates that the user had selected the corresponding class hierarchy entries ("Season" and "Circuit", respectively) resulting in the updated graphically illustrated path 502a, shown in the graphical display area 404 in FIG. 9.

Figure 7:
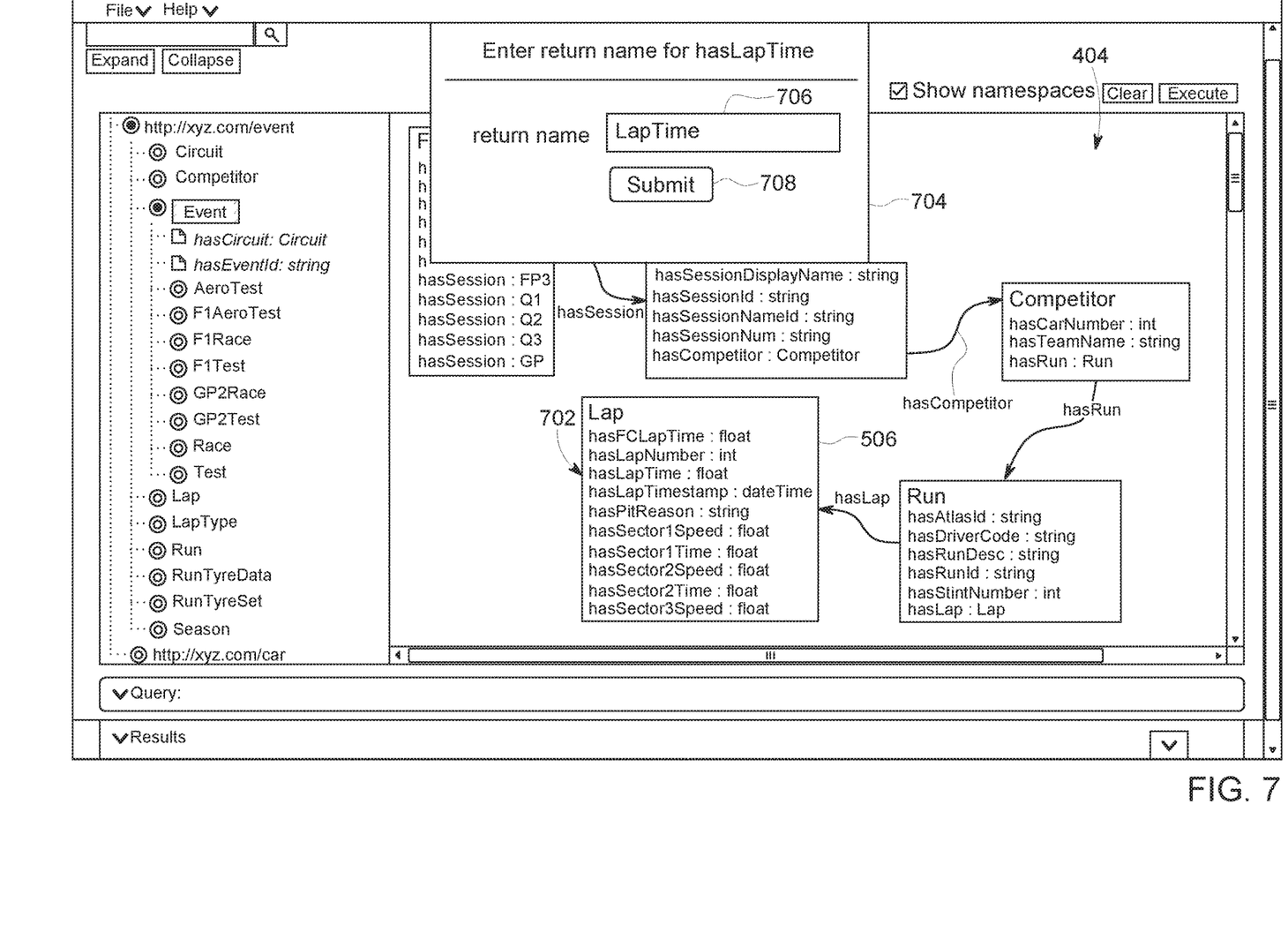
FIGS. 7-10 are further example screen displays that may be provided according to some embodiments.

Continuing to refer to FIG. 6, at S620 the user may interact with one of the nodes in the displayed path 502 (FIG. 5) by selecting (e.g., clicking on) one of the attributes listed in the node. When the user does so, the interface engine 114 may, e.g., display a menu (not shown) to allow the user to select the type of input he/she wishes to enter concerning the selected attribute. For example, as in S630 in FIG. 6, the user may indicate selection of the attribute for inclusion in the search results to be obtained by the search query that the user is arranging to have generated. FIG. 7 is a screen display that corresponds to S630. It is assumed for purposes of FIG. 7 that the user has clicked on attribute 702 ("hasLapTime") in node 506 and has indicated in the resulting menu (not shown) that the attribute is to be included in the search results. As a result, the interface engine 114 has caused the pop-up 704 to be displayed in association with the graphical display area 404. The pop-up 704 allows the user to enter a name (in data entry box 706) by which the returned search results will indicate the data returned for the selected attribute. In addition, the user can confirm the selection of the attribute for inclusion in the returned results by clicking on the "Submit" button 708 in the pop-up 704.

Figure 8:
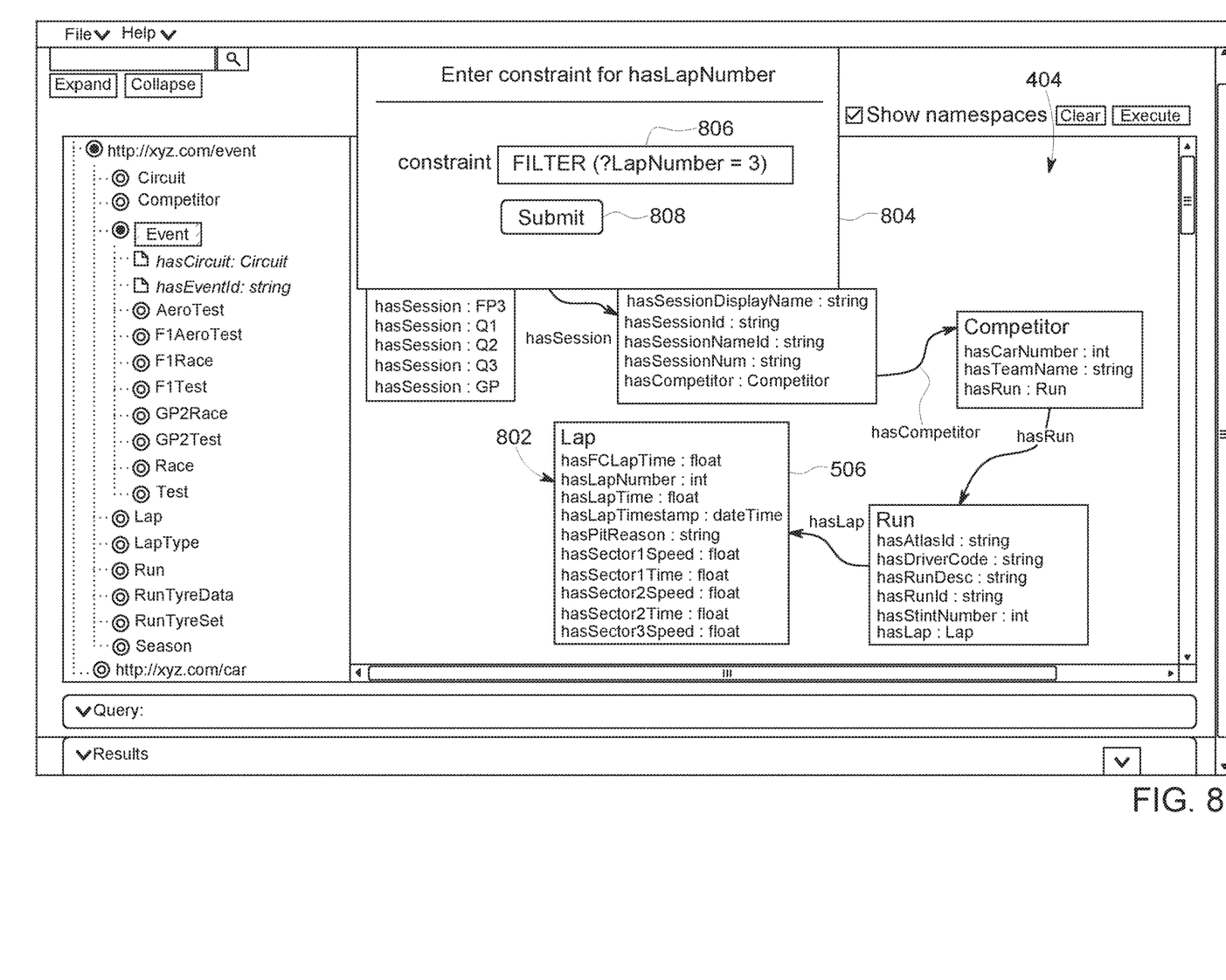

Referring once more to FIG. 6, at S640 the user may enter data to indicate a constraint that is to be applied to the selected attribute. FIG. 8 is a screen display that corresponds to S640. It is assumed for purposes of FIG. 8 that the user has clicked on attribute 802 ("hasLapNumber") in node 506 and has indicated in the resulting menu (not shown) that a constraint is to be applied to the attribute in assembling the search results. As a result, the interface engine 114 has caused the pop-up 804 to be displayed in association with the graphical display area 404. The pop-up 804 allows the user to enter data (in a data entry box 806) to define the constraint on the selected attribute. In this particular example illustrated in FIG. 8, it will be noted that the user has indicated the constraint "LapNumber=3" should be applied. The user can complete the operation of setting the constraint on the selected attribute by clicking on a "Submit" button 808.

In some embodiments, as described above, the pop-up 704 or pop-up 804 may be triggered from a respective entry in a menu (not shown). In addition or alternatively, those pop-ups may in some embodiments be triggered by left-clicking or right-clicking the selected class attribute in question. Other ways of allowing the user to invoke the corresponding functionality may also or alternatively be provided.

In some embodiments, if a menu (not shown) is part of the mechanism for invoking the select-for-return and apply-constraint functions, the menu may include a further option or options. For example, another possible menu option would allow the user to request the system 100 to suggest constraints for the selected class attribute. E.g., for the example data shown, suppose the selected attribute was the "hasTeamName" attribute of the "Competitor" class (node 512, FIG. 5). In such a case, invoking the "suggest constraint" function may cause the system 100 to display a menu comprising the team names reflected in the database, thereby aiding the user in selecting one of the team names as the constraint for that attribute.

Referring again to FIG. 6, at a decision step S650, it is determined whether the user has completed providing input (interacting with the displayed path 502/502a) to define the desired search query. If not, then the process of FIG. 6 may loop back to one or more of steps S610, S620, S630 and S640, so that the user is allowed to iteratively perform those steps and the corresponding interactions with the displayed path 502/502a to continue defining the desired search query. However, if by clicking on the "build" button 910 (FIG. 9) the user indicates that he/she has completed the input of data for the search query, then the process of FIG. 6 may advance from decision step S650 to step S660, which represents continuation of the process of FIG. 2 from S245 to S250.

At S250 in FIG. 2, the query engine 118 (FIG. 1) is triggered by the interface engine 114 to automatically generate a search query based on format and semantic rules for such queries and based on the data input by the user in connection with the process of FIG. 6. The resulting query may be displayed in the query display area 406, as indicated at 912 in FIG. 9. In some embodiments, the system 100 may permit the user to apply text editing to the displayed query 912 if the user wishes to further modify the query. In addition or alternatively, the GUI may provide an option (not shown) to permit the user to modify the displayed query 912 by returning to the process of FIG. 6 (i.e., by further interaction with the displayed path 502/502a).

Continuing to refer to FIGS. 2 and 9, if the user is satisfied with the search query as displayed at 912, he/she has the option of clicking on the "run" button 914 (FIG. 9) to indicate to the system 100 that he/she wishes that the semantic database be searched on the basis of the search query generated by the query engine 118 (possibly as modified by the user). Upon this action by the user, the process of FIG. 2 advances from S250 to S255. At S255, the search engine 120 executes the search query 912 with respect to the semantic database. In some embodiments, this operation may be performed in accordance with conventional practices. Then, as indicated at S260, the system 100 may return the results of the execution of the search query 912. These results may be displayed per the interface engine 114 and the display device 110. An example of displayed search results is indicated at 1010 in FIG. 10. In some embodiments (though not in the example screen display shown in FIG. 10), the search query that produced the displayed search results 1010 may continue to be displayed in the query display area 406. In some embodiments, the GUI may present options (not shown) to the user to allow the user to modify the search query by further interaction with the displayed path and/or to initiate an entirely new search by again providing input to lead the system 100 to generate a new search query. In the latter situation, the process of FIG. 2, as described hereinabove, may resume again at S220 and with the screen display of FIG. 4

A highly user-friendly search query building tool, as described above, may aid a domain expert in accessing data of interest from a semantic database. The user's efficiency in accessing the data may be greatly enhanced, and the ratio of time spent by the user in analyzing data of interest relative to time spent trying to obtain access to the data may be significantly improved. The tool disclosed herein may not require the user to have much if any particular knowledge of the manner in which the database was constructed, and may take advantage of the self-describing nature of semantic data to provide the domain expert with a rather intuitive experience in arriving at satisfactory search queries. Moreover, the user may be able to achieve his/her data access objectives with only a modest amount of effort and without needing to consult with a database expert.

The approach represented by the search query tool disclosed herein has the benefit of displaying the ontology as expected by the domain experts, while removing artifacts which are not directly relevant to the domain. The tool omits much of the complexity of an RDF (Resource Description Framework) graph, and instead presents what may be called a "domain-range graph". A domain-range graph may be defined as a graph where the nodes are the concepts in the ontology and there is a directed edge labeled P from concepts C1 to C2 if for some instances a and b of C1 and C2 respectively, P(a,b) would be a valid assertion with respect to the domain and range of P. In other words, there is an edge labeled P from C1 to C2 if C1 is in the domain of P and C2 is in its range. Such graphs may elegantly display the knowledge useful for generating SPARQL queries even in semantic databases built with RDFS (RDF Schema) and OWL (Web Ontology Language) axioms. The path 502 graphically displayed per FIG. 5 is one example of a domain-range graph.

In some embodiments, while the user is interacting with the displayed path 502 (FIG. 5) per S245 of FIG. 2 (and per FIG. 6), the query engine 118 may build test versions of the proposed query according to the user input received to date. The query may test run test versions of the query in background, or may otherwise evaluate the test versions of the query. For example, if the system 100 finds that a test query is likely to involve excessive search time, the system 100 may produce a pop-up or prompt (not shown) to suggest one or more constraints that the user may wish to select to improve the efficiency of the prospective database search. Thus analysis by the system of the query resulting from user input may aid in producing more effectively rendered queries.

Figure 11:
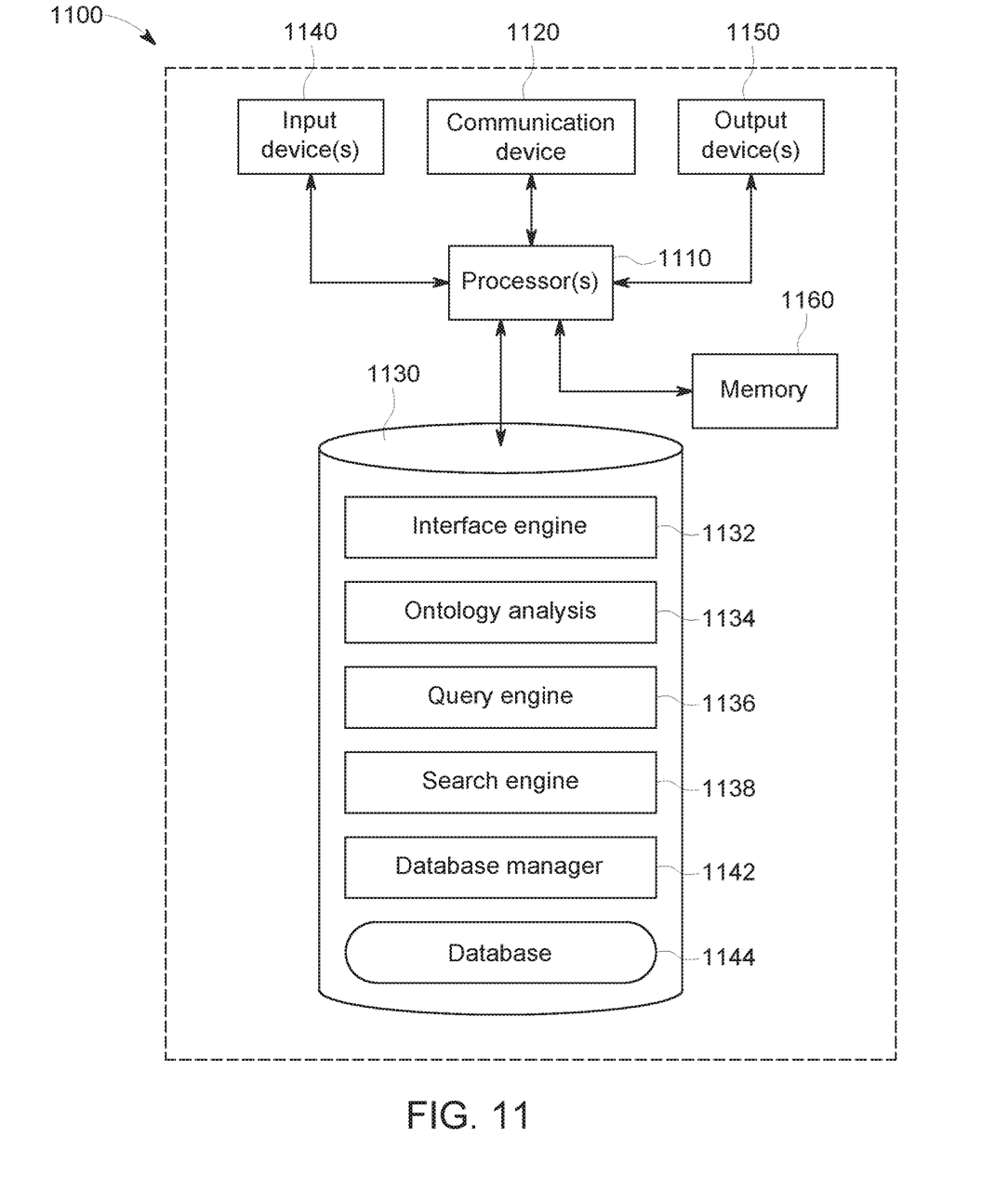
FIG. 11 is a block diagram of a computing system according to some embodiments.

System 1100 shown in FIG. 11 is an example hardware-oriented representation of the system 100 shown in FIG. 1. Continuing to refer to FIG. 11, system 1100 includes one or more processors 1110 operatively coupled to communication device 1120, data storage device 1130, one or more input devices 1140, one or more output devices 1150 and memory 1160. Communication device 1120 may facilitate communication with external devices, such as a reporting client, or a data storage device. Input device(s) 1140 may include, for example, a keyboard, a keypad, a mouse or other pointing device, a microphone, knob or a switch, an infra-red (IR) port, a docking station, and/or a touch screen. Input device(s) 1140 may be used, for example, to enter information into the system 1100. Output device(s) 1150 may include, for example, a display (e.g., a display screen) a speaker, and/or a printer.

Data storage device 1130 may include any appropriate persistent storage device, including combinations of magnetic storage devices (e.g., magnetic tape, hard disk drives and flash memory), optical storage devices, Read Only Memory (ROM) devices, etc., while memory 1160 may include Random Access Memory (RAM).

Data storage device 1130 may store software programs that include program code executed by processor(s) 1110 to cause system 1100 to perform any one or more of the processes described herein. Embodiments are not limited to execution of these processes by a single apparatus. For example, the data storage device 1130 may store a program 1132 that provides functionality corresponding to the interface engine 114 referred to above in connection with FIG. 1.

Data storage device 1130 may also store a software program 1134, which may correspond to the ontology analysis engine 116 referred to above in connection with FIG. 1.

In addition, data storage device 1130 may store a software program 1136, which may correspond to the query engine 118 referred to above in connection with FIG. 1.

Still further, data storage device 1130 may store a software program 1138 which may correspond to the search engine 120 referred to above in connection with FIG. 1.

Also, data storage device 1130 may store a semantic database manager program 1142 and a semantic database 1144, which together may constitute the database unit 122 referred to above in connection with FIG. 1. Data storage device 1130 may store other data and other program code for providing additional functionality and/or which are necessary for operation of system 1100, such as device drivers, operating system files, etc.

A technical effect is to provide improved efficiency in searching semantic databases.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of devices in communication via any number of other public and/or private networks. Two or more of such computing devices may be located remote from one another and may communicate with one another via any known manner of network(s) and/or a dedicated connection. Each device may include any number of hardware and/or software elements suitable to provide the functions described herein as well as any other functions. For example, any computing device used in an implementation of some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

In some embodiments, the search query generation tool may include additional features besides those described above. For example, the user may be provided options to change the order of columns in the reported results, to reorder the rows and/or to limit the number of rows returned. According to other features that may be provided, the user may have the opportunity to save sub-queries or to collapse sub-queries into a single display unit so that an inner join query can be built. In some embodiments, the interface engine may automatically collapse nodes in the illustrated paths where values are not being returned for those nodes; a purpose of this feature may be to save display space.

Embodiments described herein are solely for the purpose of illustration. A person of ordinary skill in the relevant art may recognize other embodiments may be practiced with modifications and alterations to that described above.

What is claimed is:

1. A method, comprising:
    displaying a screen display to a user on a display device, the screen display including (a) a class hierarchy display area displaying a hierarchy of data classes corresponding to data objects stored in a semantic database, and (b) a graphical display area;
    receiving data input from the user, the data input indicating user selection of at least two data classes from the hierarchy of data classes, the at least two data classes including a first selected data class and a second selected data class;

responding to the data input, analyzing class relationships among the at least two data classes in the semantic database to generate at least one graphically illustrated path that illustrates a path via the class relationships between the first selected data class and the second selected data class;

displaying the at least one graphically illustrated path in the graphical display area, each of the at least two data classes being represented as a node in the at least one graphically illustrated path;

receiving input indicative of interaction of the user with the displayed at least one graphically illustrated path, the user interaction including at least (a) selecting of a plurality of data fields, (b) selecting at least one class attribute from a corresponding node of the displayed at least one graphically illustrated path, and (c) defining at least one constraint and a corresponding constraint type; and automatically generating a database search query in response to the received input, the query for searching the semantic database and returning at least the selected plurality of data fields, from the semantic database, as the search results in accordance with applying the defined at least one constraint to the selected at least one class attribute.

2. The method of claim 1, wherein the displayed at least one graphically illustrated path includes at least two illustrated paths, the at least two illustrated paths including a first path and a second path;

the method further comprising:
receiving input from the user to select one of the displayed at least two illustrated paths; and
wherein the received input indicative of the interaction of the user with the selected one of the displayed at least two illustrated paths.

3. The method of claim 2, wherein the screen display further includes a query display area for displaying the database search query.

4. The method of claim 3, further comprising:
displaying prompts in association with the selected one of the displayed at least two illustrated paths for suggesting types of constraints to be applied by the user to class attributes of the at least selected two data classes.

5. The method of claim 4, wherein the displayed prompts are generated based at least in part on detected characteristics of data objects stored in the semantic database for the class attributes.

6. The method of claim 5, wherein the applying the at least one constraint to the selected at least one class attribute includes:
selecting a class attribute displayed at a node included in the selected one of the displayed at least two illustrated paths; and
entering at least one constraint value in a dialog box displayed in association with the selected class attribute.

7. The method of claim 6, further comprising
displaying a search box as part of the screen display, the search box for receiving input data to cause highlighting of at least one entry in the displayed hierarchy of data classes.

8. The method of claim 7, further comprising:
displaying the automatically generated database search query in the query display area.

9. The method of claim 8, wherein the database search query is generated in response to an actuation by a user of a button included in the screen display.

10. The method of claim 9, further comprising:
executing the displayed database search query; and
displaying the search results of execution of the displayed database search query.

11. The method of claim 10, further comprising:
allowing the user to apply text editing to the displayed database search query.

12. An apparatus for automatically generating a database search query based on interaction of a user with a graphical user interface, the apparatus comprising:
a display device;
an interface engine operatively coupled to the display device for generating screen displays for display by the display device and for receiving input information via the interaction of the user with the screen displays;
a database unit for storing a semantic database;
an ontology analysis engine, coupled to the database unit and to the interface engine, for analyzing an ontology exhibited by the semantic database;
a query engine, operatively coupled to the interface engine, for generating the database search query in response to the input information received by the interface engine; and
a search engine, operatively coupled to the query engine, the interface engine and the database unit, for searching the semantic database in accordance with the database search query generated by the query engine, and for returning results of the searching from the semantic database;
wherein:
the interface engine causes the display device to display a class hierarchy of data classes corresponding to data objects stored in the semantic database;
the interface engine allows the user to select at least two of the data classes from the class hierarchy;
the at least selected two data classes including a first selected data class and a second selected data class;
the ontology analysis engine responds to the selection of the at least two data classes by analyzing class relationships within the ontology exhibited by the semantic database to generate at least two class relationship paths, the at least two class relationship paths including (a) a first path of class relationships between the first selected data class and the second selected data class, and (b) a second path of class relationships between the first selected data class and the second selected data class, the second path being different from the first path;
the interface engine responsive to the ontology analysis engine to display, on the display device, the first and second paths in a screen display that includes the class hierarchy, each of the selected at least two data classes being represented as a node in the first and second paths;
the interface engine allowing the user to select one of the first and second displayed paths;
the interface engine allowing the user to interact with elements of the selected one of the first and second paths;
the query engine responsive to the interface engine to generate the database search query based on the user interaction with elements of the selected one of the first and second paths, wherein the user interaction with the elements of the selected one of the first and second paths includes at least (a) selecting a plurality of data fields, (b) selecting a class attribute from a corresponding node of the selected one of the first and second paths, and (c) defining at least one constraint and a corresponding constraint type, the selecting indicates that at least the plurality of data fields is to be returned from the semantic database as search results by executing the database search query and that the defined constraint is to be applied to the selected class attribute to generate the search results.

13. The apparatus of claim 12, wherein:
the interface engine opens a dialog box on the display device in association with a selected class attribute,
the dialog box for allowing the user to specify the defined constraint to be applied to the selected class attribute;
the interface engine further causing the display device to display a search box, the search box for receiving input data to cause highlighting of at least one entry in the displayed class hierarchy; and
the interface engine causes the display device to display the search results returned by the search engine.

14. An apparatus, comprising:
a hardware processor; and
a memory in communication with the hardware processor, the memory storing program instructions, the hardware processor operative with the program instructions to perform functions as follows:
displaying a screen display to a user on a display device, the screen display including (a) a class hierarchy area in which a hierarchy of data classes corresponding to data objects stored in the semantic database is displayed, and (b) a graphical display area;
receiving data input from the user, the data input indicating user selection of at least two data classes from the hierarchy of data classes, the at least two data classes including a first selected data class and a second selected data class;
responding to the data input, analyzing class relationships among the at least two data classes in the semantic database to generate at least one graphically illustrated path that illustrates a path via the class relationships between the first selected data class and the second selected data class;
displaying the at least one graphically illustrated path in the graphical display area, each of the at least two data classes being represented as a node in the at least one graphically illustrated path;
receiving input indicative of interaction of the user with the displayed at least one graphically illustrated path, the user interaction including at least (a) selecting of a plurality of data fields, (b) selecting at least one class attribute from a corresponding node of the displayed at least one graphically illustrated path, and (c) defining at least one constraint and a corresponding constraint type; and
automatically generating a database search query in response to the received input, the query for searching the semantic database and returning at least the selected plurality of data fields, from the semantic database, as the search results in accordance with applying the defined at least one constraint to the selected at least one class attribute.

15. The apparatus of claim 14, wherein the displayed at least one graphically illustrated path includes at least two illustrated paths, the at least two illustrated paths including a first path and a second path;
the processor further operative with the program instructions to receive input from the user to select one of the displayed at least two illustrated paths; and
wherein the received input indicative of the interaction of the user with the selected one of the displayed at least two illustrated paths.

16. The apparatus of claim 15, wherein the screen display further includes a query display area for displaying the database search query.

17. The apparatus of claim 16, wherein the processor is further operative with the program instructions to display prompts in association with the selected one of the displayed at least two illustrated paths for suggesting types of constraints to be applied by the user to class attributes of the at least selected two data classes.

* * * * *